June 3, 1930.                A. W. CONNOR ET AL                1,761,657
                              REMOVABLE SEAT COVER
                              Filed April 14, 1928
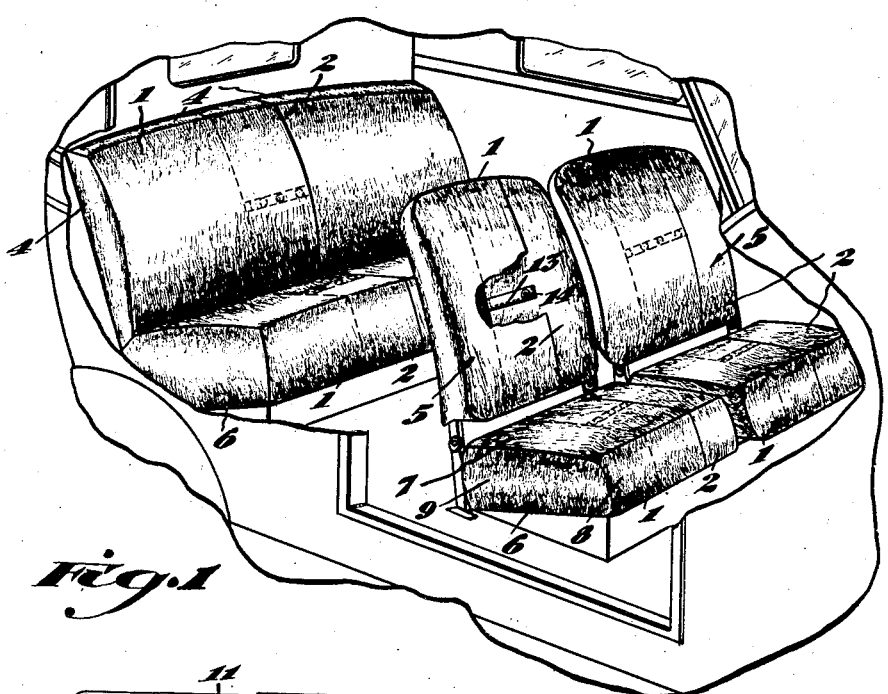
Fig.1
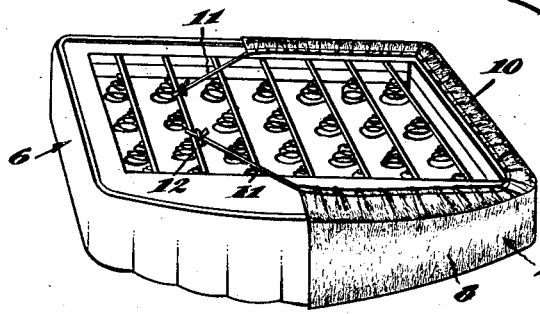
Fig.2
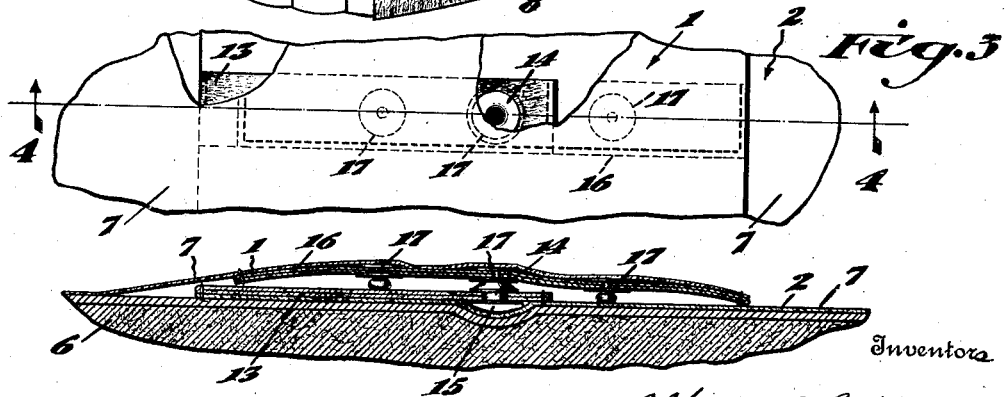
Fig.3
Fig.4
Inventors
Albert W. Connor
Sidney H. Schwartz
By Ward & Ward
Attorneys Patented June 3, 1930

1,761,657

UNITED STATES PATENT OFFICE

ALBERT W. CONNOR AND SIDNEY H. SCHWARTZ, OF CINCINNATI, OHIO, ASSIGNORS TO THE BILTMORE ERO MANUFACTURING COMPANY, OF CINCINNATI, OHIO, A CORPORATION OF OHIO

REMOVABLE SEAT COVER

Application filed April 14, 1928. Serial No. 270,120.

This invention relates to removable furniture or seat covers which are disclosed herein as applied to the interior of an automobile.

The object of this invention is to provide removable furniture covers, one size of which is adapted to be used upon seats or furniture of different widths, or in other words, to provide a standard line of covers adapted to accommodate themselves to minor dimension variations in the articles to be covered.

Another object is to provide sectional seat or back covers which are adapted to be applied to the seat or back in half sections drawn from the opposite edges thereof toward the center and adjustably fastened and overlapped medially of the seat, permitting a snug fitting adjustable attachment of the covers.

Further objects and advantages will be more fully set forth in a description of the accompanying drawings, forming a part of this specification, in which:

Figure 1 is a perspective view of the interior of an automobile showing the removable covers, to which this invention is directed, applied to the various type seats of the automobile, the view being fragmentary and broken away for the purposes of illustration.

Figure 2 is a perspective view of the underside of a seat, showing the manner of attaching the draw string of a sectional seat cover to the under parts of the seat.

Figure 3 is a fragmentary top plan view of the adjustment means at the overlap of the seat cover sections, certain parts of the view being broken away to aid in the illustration of the adjustment feature.

Figure 4 is a sectional view taken on line 4—4, Figure 3, further detailing the manner of adjustably securing the seat sections together.

The covers of this invention comprise, for each seat or back to be covered, half sections, one adapted to fit upon each side of the seat, said members proportioned to overlap in the middle, one over the other. The degree of tolerance as to the size of furniture these covers will fit depends upon the extent of the overlap.

The upper section of the overlapper portion is designated at 1 upon the drawings, and the under section as 2. When these sections 1, 2, are applied to the built-in back cushion as in the rear of an automobile, their edges 4 are tacked to the vehicle. When applied to the collapsible backs 5 as at the front of the automobile, the sections form an envelope encasing said backs. When applied to the removable seat cushions 6 themselves, the edges of these members are turned under at the bottoms.

Each of the seat cushion cover sections has the surface 7 adapted to cover a half portion of the top of the seat, side portions 8 adapted to cover the front and back of the seat, an end portion 9 adapted to cover one end of the seat, and a margin or flap portion 10 adapted to be turned under the seat and to be held there by a draw string 11 passing through this marginal portion, the draw string being secured to the bottom elements 12 of the seat.

It is preferable in so positioning one of these covers upon a seat that the end of the draw string passing through the front of the seat cover, being tied first to the frame of the cushion, the front of the cover is then adjusted upon the draw string to avoid undesirable bunching or folding, after which the rest of the cover is adjusted and the other end of the string likewise tied to the seat frame.

All of the seat cover sections are of this general formation, the specific and detailed contouring being dependent upon the shape of the article being covered and the intended exposed sides of said article. The sections 1, 2, are secured together at their overlap by means of snap fasteners, the lower section having an overlapped strip of material 13 stitched to it inwardly of the cover, into which strip is secured the female member 14 of a snap fastener, the fastener head 15 being disposed between the material of the cover section and the strip.

The upper section margin is likewise provided, adjacent to the margin which overlaps the lower member, with an overlapped strip 16 of reinforcing material which has secured therein three male snap fastener elements 17 aligned transversely to the margin of said section, adapted to cooperate with the one held by the lower member, so that any one can be used selectively to secure the seat cover sections together.

It will be understood, of course, that while the seat covers of this invention are illustrated as applied to the interior of an automobile, they may also be applied to furniture, such as davenports, easy chairs, etc., by making the appropriate changes in the configuration of the outer margins of the seat cover members to fit the type of article of furniture in question.

Having described our invention, we desire to be limited only by the ensuing claims:

1. A cover for cushions, comprising, half sections of bag-like formation shaped to enclose opposite cushion sides, and draw strings disposed through the margin of the sections on the underside of the cushion, the ends of said draw strings attachable to the cushion, whereby the sections may be drawn inwardly on the cushion to overlapped marginal relation.

2. A cover for cushions, comprising, half sections shaped to envelop respectively opposite sides of the cushion, means for drawing the sections inwardly into overlapped relation, a transversely disposed series of snap fastener elements secured on the margin of one of said sections, and a cooperating snap fastener element disposed on the margin of the other section adjacent the series and adapted to cooperate with any one of said series depending on the degree of overlap required to draw the sections snugly on the cushion.

3. A cover for cushions, comprising, half sections enveloping respectively opposite sides of said cushion, said sections overlapping medially of said cushion, a transversely disposed series of fastener elements secured on the margin of one of said sections, a companion fastening element secured on the margin of the other section adjacent the series for cooperation with any one of said series to suitably join the sections in various degrees of overlap.

4. An extensible cover for a cushion, comprising, sections, each section adapted to enclose respectively opposite portions of the cushion for covering the top and sides thereof and including a margin adapted to be turned under the cushion, and a draw string in said margin having its loose ends disposed inwardly for attachment to the cushion whereby the sections may be drawn inwardly into overlapped relation about the cushion.

In witness whereof we hereunto subscribe our names.
ALBERT W. CONNOR.
SIDNEY H. SCHWARTZ.